United States Patent [19]

Pan et al.

[11] Patent Number: 5,225,250
[45] Date of Patent: Jul. 6, 1993

[54] METHOD OF IMPREGNATING USING A FLOATING BLADE

[75] Inventors: Jing-Pin Pan, Hsinchu; Tong-Chee Hsu, Taipei, both of Taiwan

[73] Assignee: Industrial Technology Research Institute, Taiwan

[21] Appl. No.: 827,591

[22] Filed: Jan. 29, 1992

[51] Int. Cl.⁵ .............................................. B05D 1/18
[52] U.S. Cl. .............................. 427/434.2; 427/434.4; 427/443.2; 118/419; 118/427
[58] Field of Search ............... 427/434.2, 434.4, 443.2; 118/427, 419, 405

[56] References Cited

U.S. PATENT DOCUMENTS

| | | |
|---|---|---|
| 3,058,151 | 10/1962 | Gonsalves .......................... 427/434.4 |
| 3,526,536 | 9/1970 | Spengos et al. . |
| 4,207,362 | 6/1980 | Porter et al. ...................... 427/434.4 |
| 4,444,814 | 4/1984 | Flinchum et al. ................. 427/378 |
| 4,500,584 | 2/1985 | Modic ................................. 428/145 |
| 4,543,145 | 9/1985 | Schnell et al. ..................... 427/346 |

*Primary Examiner*—Shrive Beck
*Assistant Examiner*—Katherine A. Bareford
*Attorney, Agent, or Firm*—Scully, Scott, Murphy & Presser

[57] ABSTRACT

An impregnation method of a web using a pair of floating blades arranged in parallel to the surface of a coating solution. The web is perpendicular to and in between the pair of bars arranged and then withdrawn from the solution gradually to form an even thickness coating on the web.

7 Claims, 3 Drawing Sheets

METHOD OF IMPREGNATING USING A FLOATING BLADE

BACKGROUND OF INVENTION

The present invention relates to a method of impregnating a resin of uniform thickness onto a web using a floating blade, in particular, to a method of continuous impregnating process to obtain a web having a resin of uniform thickness despite impregnating conditions.

U.S. Pat. No. 3,526,536 discloses a bead coating process of a web and the apparatus thereof. In this prior art, a knife-like control means is employed in controlling the uniformity and flatness of the coated film. However, the concept of a floating knife has not been employed as a means to accommodate variation in liquid height, and this will cause undesirable effect to the uniformity and quality of coating. As a result, it will not be suitable for semi-batch or batch system. In addition, the concept of floatation and the balance of force have not been used to self-adjust the gap between the web and the floating knife so as to mitigate the factors (vibration of the solution surface, speed change of the web, etc.) which cause the changing of the coating uniformity and quality.

U.S. Pat. No. 4,500,584 to Frank J. Modic discloses a roofing fabric membrane structure and the manufacturing method thereof. In this process a base coating composition is applied to a base fabric material and then the coating composition is cured.

U.S. Pat. No. 4,543,145 to Peter Schnell et al discloses a process for the continuous production of single-ply or multiply laminates. The process comprises applying a continuous resin film onto a travelling web, carrying the resin film being combined with a pre-tensioned web and curing the resin carrying web thus formed.

In both the prior patents, U.S. Pat. Nos. 4,500,584, and 4,543,145, a fixed knife or air knife is used to remove the excess of the resin to control the thickness of the resin are disclosed. These prior art do not disclose the employment of the balance of the surface tension force and hydrodynamic force in order to lower the influences of thickness due to the variation of impregnating conditions. If these influences are to be reduced, other supplementary automatic control equipment or devices must be added. For instance, in U.S. Pat. No. 3,526,536 to A.C.Spengos et al disclosed a method and apparatus applying a liquid to the surface of a web by the dip coating and bead coating processes. Other prior methods have been disclosed on the removal of the excess of resin coated on the web. For instance, by doctoring with air knife, blade or knife. However, the doctoring devices are firmly fixed in position from which constant doctoring force is maintained magnetically on either side of the web. In such a case, if the impregnating conditions change, the gap between the web and the floating bar will not change accordingly.

SUMMARY OF THE INVENTION

Accordingly, it is an object of the present invention to provide an impregnation method for the continuous production of a web coated with resin of even thickness.

It is another object of the present invention to provide an impregnation method which can improve the quality of impregnation.

Other features and advantages of the present invention are stated on or apparent from a detailed description of a presently preferred embodiment of the invention found hereinbelow.

BRIEF DESCRIPTION OF THE DRAWINGS

The present invention will be further explained with reference to the annexed drawings, wherein.

DETAILED DESCRIPTION OF THE INVENTION

While this specification concludes with claims particularly pointing out and distinctly claiming that which is considered to be the invention, it is believed that the invention can be better understood from a reading of the following detailed description of the invention.

In the process of a continuous coating, a transmission system used has a relatively excellent speed control function so as to effectively control the coating thickness on the web. And if the continuous coating process is carried out at a relatively low speed, the precision of speed is relatively difficult to control and therefore more automatic control equipment is needed. In accordance with the present invention, by the use of the self-adjustment of gap between web and floating bar, the problems of uneven thickness coating due to the lowering of speed can be avoided. As a result, the need of precisely controlling the speed during the coating process may not be considered to be critical.

In the process of impregnation, the change of viscosity will affect the thickness formed. In accordance with the present invention, the influence on the thickness due to the change of the viscosity will also be lowered. In addition, in the process of continuous coating, if the varnish used contains low boiling point solvents, the problem of volatility will arise. The rate of evaporation from the surface of the solution cannot be effectively controlled to achieve a relatively uniform situation. Accordingly, the surface tension of the solution contacting the surface of the web will vary. Besides, as a result of the evaporation of the solvent and the consumption of the varnish, the height of the liquid surface will also change in the semi-batch or in a system batch. In accordance with the present invention, owing to the use of a floating bar which adheres to the web through surface tension, fluctuations in properties of liquid properties and liquid height will have a relatively small influence on quality of the coating. Thus, the thickness of the coated surface can be easily controlled. In other words, the present invention is in particular suitable to be used in semi-batch or batch system of impregnation. Furthermore, the present invention makes use of the force balance between the surface tension and hydrodynamic force so as to automatically adjust the gap stably. Thus, the external disturbance on the uniformity of the coating is reduced.

Figure 1:
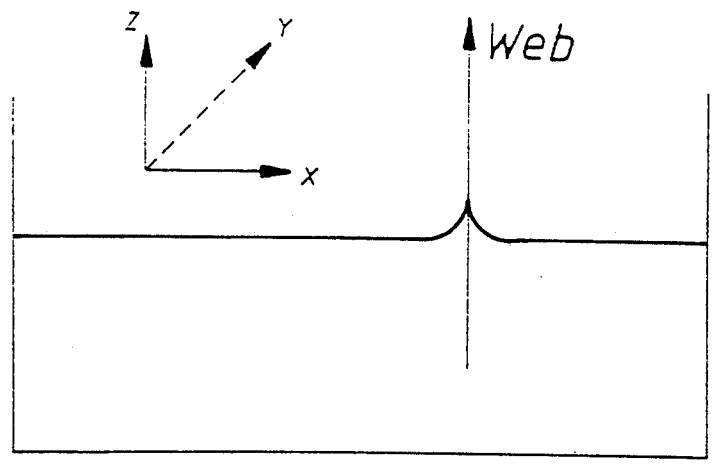
FIG. 1 is a schematic view showing a prior method of impregnation.

Referring to FIG. 1, it is a schematic view showing a prior method of impregnation wherein a web is vertically drawn through the coating solution.

For the conventional type of impregnating method, the thickness of the single-sided resin formed coated on the surface can be represented by the following equation (1). As shown in the equation, the thickness of the resin is dependent on the viscosity of the resin, surface tension of the coating solution and the impregnating rate of the web. If the change of viscosity or the impregnating rate is not stable, the impregnated thickness will be also changed.

$$h = 1.32R \left(\frac{v\eta}{\sigma}\right)^{2/3} \quad (1)$$

wherein h: the impregnated thickness
η: dynamic viscosity
σ: surface tension
v: coating rate
R: the radius of curvature of the menius where the coating film leaves the liquid.

Figure 2:
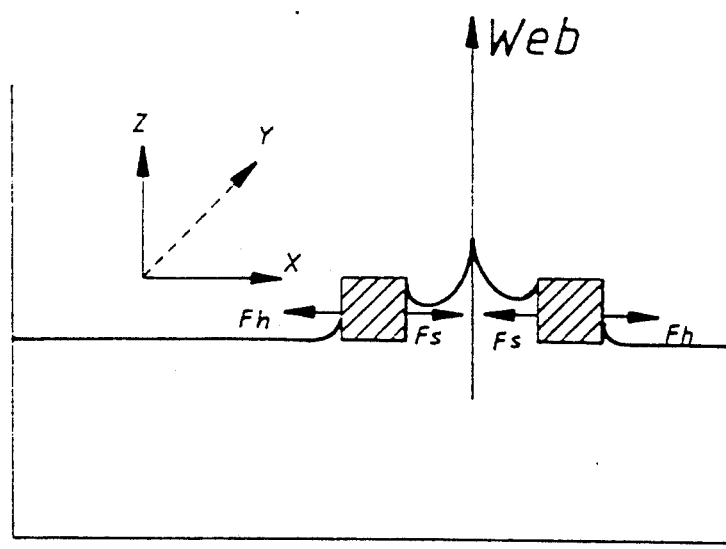
FIG. 2 is a schematic view showing the method of impregnation in accordance with the present invention.
Figure 3:
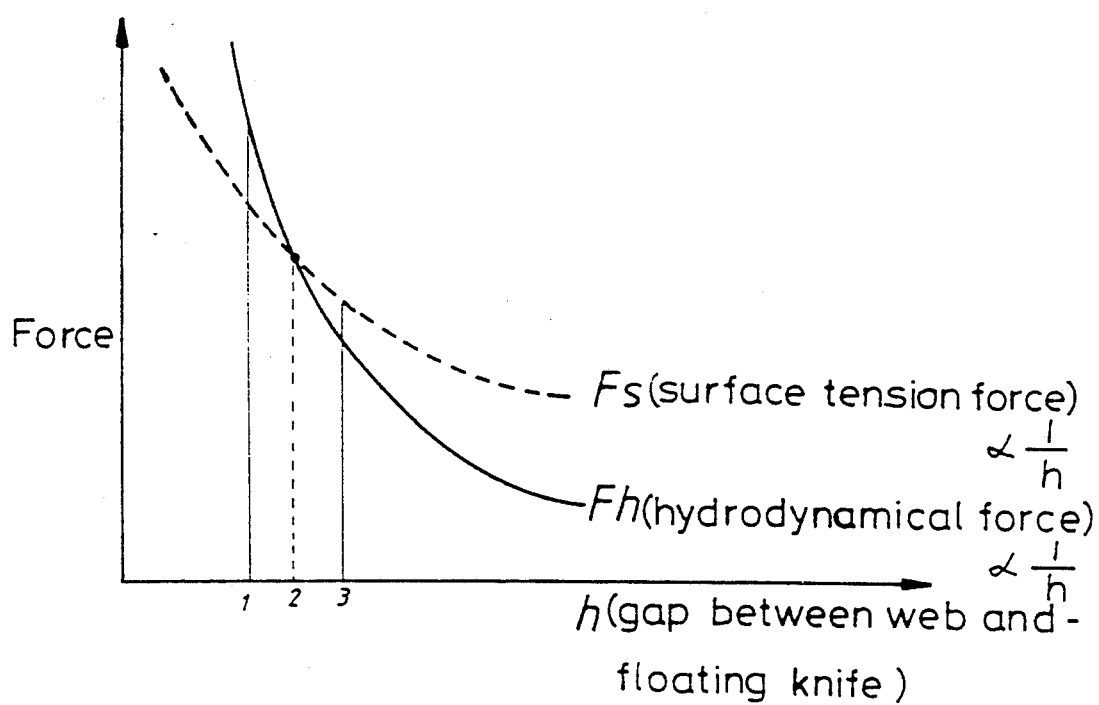
FIG. 3 is a graph showing the relationship between the surface tension force, the hydrodynamical force and the gap between web and floating knife.

In accordance with the present invention, referring to FIG. 2 two parallel floating bars are placed perpendicular to the x-axis and parallel to the y-axis on the surface of the coating solution, and the web is placed in between the bars and approximately equidistant from each bar. Preferably, the distance between the web and the bar is about 1 mm to 2 mm, and the length of the bar is longer than the width of the web. Due to the surface tension of the coating solution, the bars approach closely to the web, and are balanced at a specific distance, which is shown in FIG. 3. FIG. 3 also shows how the gap (h) between the web and the floating knife is self-adjusted or determined through a balance of surface tension Fs and hydrodynamic force Fh, wherein at position 1: $F_h > F_s$, the gap is pushed from position 1 to position 2, at position 3: $F_s > F_h$, the gap is pulled from position 3 to 2, and position 2: shows a stable equilibrium gap. The doctoring angle between the solution and the surface of the bar is about 0° to 45°, which is similar to the conventional type of mounting of a knife within the impregnating tank. The thickness of the single-sided resin of the impregnation is more or less similar to equation 1, but a floating knife is to be mounted thereto.

In accordance with the present invention, a uniform and consistent surface tension in between the web and the coating solution (varnish) is thus maintained. Besides, the bars will move according to the movement of the liquid surface without having much effect on the impregnation conditions. As a result, it is not critical to pay close attention to them in controlling the liquid surface. Furthermore, the bars will also prevent attachment of air bubbles from rest of the bath onto the surface of the web and the quality of the impregnation will thus increase. Additionally, the bar can be self-adjusted along the x-axis, and the fluctuation of the level of the solution and the resultant wave motion will not cause significant changes uniformity and quality on the coating.

EXAMPLE 1

Figure 4:
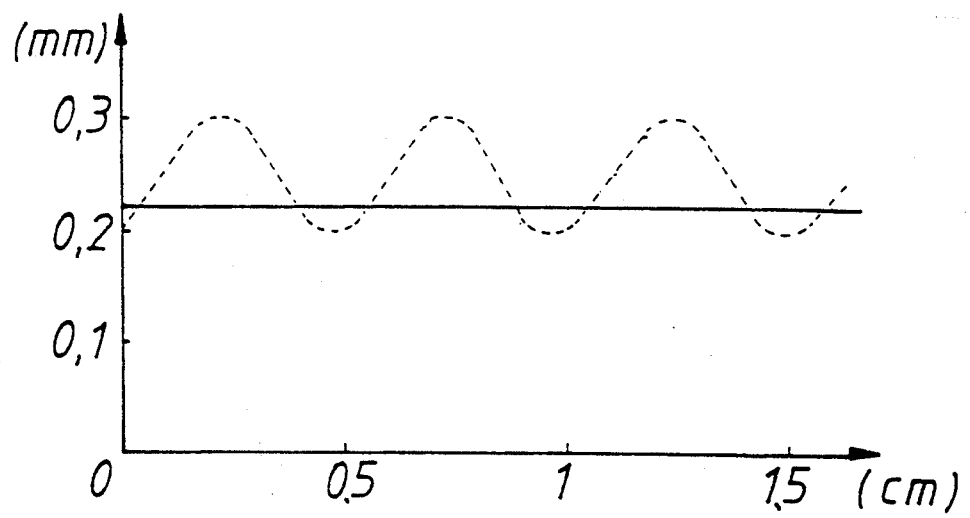
FIG. 4 is a graph showing the relation between the thickness of web and the machine direction for Example 1 in accordance with the present invention.

A continuous impregnation process was carried out by the use of a varnish solution and a glass cloth 2116. The glass cloth 2116 was placed vertically in between two bars, floating horizontally and in parallel to the solution within an impregnation tank. The floating bars were constructed out of styrofoam wrapped in aluminium foil with a specific gravity of approximately 0.3. The varnish was a bismalimide based varnish with surface tension (σ)=40 dyne/cm, density (ρ)=1.1 g/cm³, viscosity=200 cps, rate of impregnating=7.5 cm/min. If no floating bar is provided on the surface of the solution, the thickness of impregnating in machine direction varied periodically from 0.2 mm to 0.3 mm. If floating bars are provided and other impregnation conditions are maintained but with doctoring angle of 10°, an even thickness of about 0.2 to 0.22 mm on the glass cloth was obtained. This shows that thickness formed is comparatively lower than that in the machine direction and is uniform. FIG. 4 indicates the result of Example 1.

EXAMPLE 2

Figure 5:
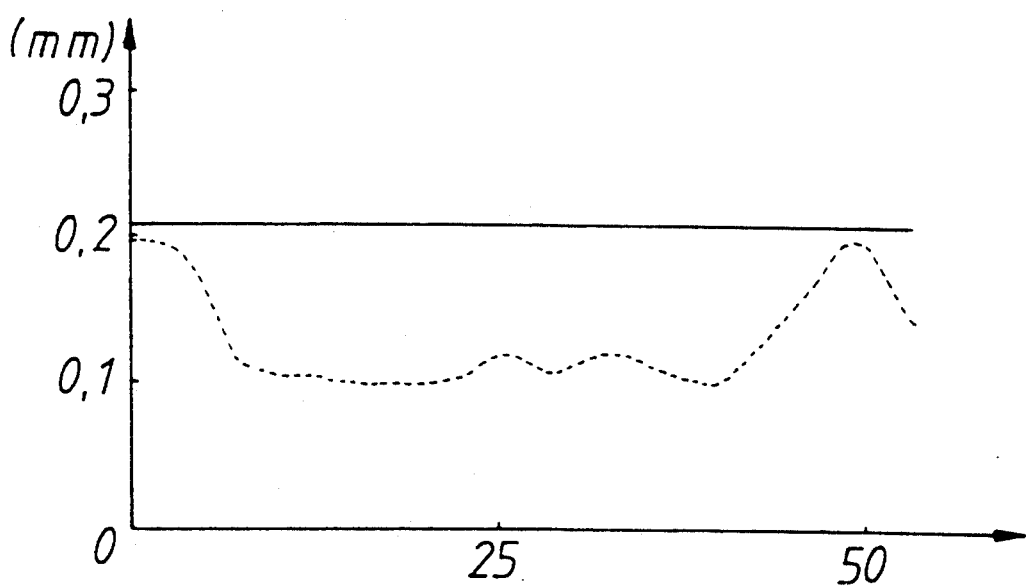
FIG. 5 is a graph showing the relation between the thickness of web and the machine direction for Example 2 in accordance with the present invention.

A continuous impregnation process was carried out by the use of a varnish solution and a glass cloth 2116. The glass cloth 2116 was placed vertically in between two bars, floating horizontally and in parallel to the solution within a impregnation tank. The floating bars were constructed out of styrofoam wrapped in aluminium foil with a specific gravity of approximately 0.3. The varnish was a bismalimide based varnish with surface tension (σ)=38 dyne/cm, density (ρ)=1.0 g/cm³, viscosity=20 cps, rate of impregnating=7.5 cm/min. If no free bar is provided on the surface of the solution, the thickness of impregnating in machine direction varied periodically from 0.12 mm to 0.22 mm. If free bars are provided and other impregnation conditions are maintained but with doctoring angle of 8°, a uniform thickness of about 0.2 to 0.22 mm on the glass cloth was obtained. This shows that the thickness formed is comparatively lower than that in the machine direction and is uniform. FIG. 5 indicates the result of Example 2.

In accordance with the present invention, the web material may be selected from glass cloth, nylon and cotton cloth.

While the invention has been described with respect to certain preferred exemplifications and embodiments, it is not intended to limit the scope of the invention thereby, but solely by the claims appended hereto.

We claim:

1. A method of impregnation using a floating blade/knife comprising the steps of:
   (a) arranging a pair of floating bars having a specific gravity smaller than that of a coating solution on the surface of said coating solution in a tank; and
   (b) vertically impregnating a web with the coating solution by drawing the web through the coating solution and then in between the bars, each bar located such a distance from the web to impregnate the coating solution on the web.

2. A method of impregnation as set forth in claim 1, wherein the coating solution is bismalimide based varnish.

3. A method of impregnation as set forth in claim 1, wherein the web is vertical and approximately equidistant from the pair of floating bars.

4. A method of impregnation as set forth in claim 1, wherein the web comprises material which is selected from the group consisting of glass cloth, cotton cloth, and nylon.

5. A method of impregnation as set forth in claim 1, wherein the distance between the web and each bar is about 1 mm to 2 mm, and the actual distance is self-adjusted through balance of forces on each bar.

6. A method of impregnation as set forth in claim 1, wherein the length of each bar is longer than the width of the web.

7. A method of impregnation as set forth in claim 1, wherein the doctoring angle between coating the solution and the surface of the bar is about 0° to 45°.

* * * * *